(12) United States Patent
Huang

(10) Patent No.: US 12,135,914 B2
(45) Date of Patent: Nov. 5, 2024

(54) AUDIO CIRCUIT, AND DEVICE AND CONTROL METHOD RELATED THERETO

(71) Applicant: VIVO MOBILE COMMUNICATION CO., LTD., Guangdong (CN)

(72) Inventor: Yewei Huang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 161 days.

(21) Appl. No.: 17/475,827

(22) Filed: Sep. 15, 2021

(65) Prior Publication Data

US 2022/0004352 A1 Jan. 6, 2022

Related U.S. Application Data

(63) Continuation of application No. PCT/CN2020/077740, filed on Mar. 4, 2020.

(30) Foreign Application Priority Data

Mar. 15, 2019 (CN) .......................... 201910200071.9

(51) Int. Cl.
*G06F 3/16* (2006.01)
*G06F 13/40* (2006.01)
*H04R 5/04* (2006.01)

(52) U.S. Cl.
CPC ................ *G06F 3/16* (2013.01); *G06F 13/40* (2013.01); *H04R 5/04* (2013.01); *G06F 2213/0042* (2013.01); *H04R 2420/01* (2013.01)

(58) Field of Classification Search
CPC .... G06F 3/16; G06F 13/40; G06F 2213/0042; H04R 5/04; H04R 2420/01
See application file for complete search history.

(56) References Cited

U.S. PATENT DOCUMENTS

2016/0246747 A1 8/2016 Rand et al.
2016/0365082 A1* 12/2016 Poulsen ............. G10K 11/1785
(Continued)

FOREIGN PATENT DOCUMENTS

CN 105872869 A 8/2016
CN 105872904 A 8/2016
(Continued)

OTHER PUBLICATIONS

Texas Instruments, "PCM2912A Audio Codec With USB Interface, Mono Microphone Input and Stereo Headphone Output", Aug. 2015, pp. 1-37. (Year: 2015).*

(Continued)

*Primary Examiner* — Daniel R Sellers
(74) *Attorney, Agent, or Firm* — Price Heneveld LLP

(57) ABSTRACT

An audio circuit includes: a first Type-C port, a first microphone input module, and a second microphone input module; the first Type-C port includes a first pin and a second pin, the first microphone input module is connected to the first pin, and the second microphone input module is connected to the second pin; in a case that the first Type-C port and a second Type-C port of the earpiece are in a first plugging state, the first pin is connected to a third pin of the second Type-C port, and the second pin is connected to a fourth pin of the second Type-C port; and in a case that the first Type-C port and the second Type-C port are in a second plugging state, the second pin is connected to the third pin, and the first pin is connected to the fourth pin.

11 Claims, 4 Drawing Sheets

(56) References Cited

U.S. PATENT DOCUMENTS

| | | | |
|---|---|---|---|
| 2017/0150283 A1* | 5/2017 | Taylor | H01R 24/58 |
| 2017/0031855 A1 | 7/2017 | Zhao | |
| 2017/0195778 A1* | 7/2017 | Zhao | H04R 1/1091 |
| 2017/0230747 A1* | 8/2017 | Song | H04R 1/10 |
| 2018/0027330 A1* | 1/2018 | Rand | G06F 13/387 |
| | | | 381/309 |
| 2018/0270593 A1 | 9/2018 | Taylor et al. | |
| 2018/0349296 A1* | 12/2018 | Rand | G06F 13/102 |
| 2021/0109878 A1* | 4/2021 | Jiang | H04R 5/04 |

FOREIGN PATENT DOCUMENTS

| | | |
|---|---|---|
| CN | 106454594 A | 2/2017 |
| CN | 108268395 A | 7/2018 |
| CN | 108666826 A | 10/2018 |
| CN | 108966085 A | 12/2018 |
| CN | 109918041 A | 6/2019 |
| WO | 2018020233 A1 | 2/2018 |

OTHER PUBLICATIONS

Max Robinson and Mike McCarty, "Grounds and All That", Nov. 17, 2007, "https://www.angelfire.com/electronic/funwithtubes/Grounds.html", retrieved from archive.org at "http://web.archive.org/web/20071117190810/http://www.angelfire.com:80/electronic/funwithtubes/Grounds.html", pp. 1-4. (Year: 2007).*

Max Robinson, "Eliminating Ground Loops", Sep. 5, 2004, "https://www.angelfire.com/electronic/funwithtubes/Eliminating_Ground_Loops.html", retrieved from archive.org at "http://web.archive.org/web/20040905072140/https://www.angelfire.com/electronic/funwithtubes/Eliminating_Ground_Loops.html", pp. 1-4 (Year: 2004).*

Bob Cordell, "Designing Audio Power Amplifiers", 2011, McGraw Hill, pp. 343-362. (Year: 2011).*

Rane, "Grounding and Shielding Audio Devices", 2002, RaneNote 151, pp. 1-15. (Year: 2002).*

* cited by examiner

USAudio CIRCUIT, AND DEVICE AND
CONTROL METHOD RELATED THERETO

CROSS-REFERENCE TO RELATED
APPLICATIONS

This application is a continuation application of International Application No. PCT/CN2020/077740 filed on Mar. 4, 2020, which claims priority to Chinese Patent Application No. 201910200071.9, filed in China on Mar. 15, 2019, both disclosures of which are incorporated herein by reference in their entireties.

TECHNICAL FIELD

This disclosure relates to the field of communications technologies, and in particular, to an audio circuit and a device and control method related thereto.

BACKGROUND

As a new type of USB port, Type-C ports are gradually applied to terminals, to implement charging, audio transmission, and data transmission for the terminals. With a Type-C port of a terminal connected to a Type-C analog earpiece, analog audio transmission can be performed between the terminal and the Type-C analog earpiece.

However, in the related art, when a Type-C analog earpiece plugs into a Type-C port of a terminal, two switches are typically provided in the Type-C port to implement switching between an output pin and a ground pin of a microphone of the Type-C analog earpiece that is inserted normally or reversely.

However, wearing of the switches may increase recording distortion, leading to poorer recording quality. It can be learned that currently, when a Type-C analog earpiece is inserted into a Type-C port of a terminal, there is a problem of deteriorated recording quality caused by the provision of switches.

SUMMARY

According to a first aspect, an embodiment of this disclosure provides an audio circuit, applied to a terminal, where the terminal and an earpiece are able to be connected by plugging, and the audio circuit includes a first Type-C port, a first microphone input module, and a second microphone input module; the first Type-C port includes a first pin and a second pin, the first microphone input module is connected to the first pin, and the second microphone input module is connected to the second pin; and the first microphone input module is different from the second microphone input module;

in a case that the first Type-C port and a second Type-C port of the earpiece are in a first plugging state, the first pin is connected to a third pin of the second Type-C port, and the second pin is connected to a fourth pin of the second Type-C port; and in a case that the first Type-C port and the second Type-C port are in a second plugging state, the second pin is connected to the third pin, and the first pin is connected to the fourth pin; where the third pin is configured to connect to a first audio signal terminal of a microphone of the earpiece, and the fourth pin is configured to connect to a first ground terminal of the microphone and is grounded.

According to a second aspect, an embodiment of this disclosure further provides an audio circuit, applied to an earpiece, where the earpiece and a terminal are able to be connected by plugging, the audio circuit includes a second Type-C port and a microphone, the second Type-C port includes a third pin and a fourth pin, the microphone is provided with a first audio signal terminal and a first ground terminal, the first audio signal terminal is connected to the third pin, and the first ground terminal is connected to the fourth pin and is grounded;

in a case that the second Type-C port and a first Type-C port of the terminal is in a first plugging state, the third pin is connected to a first pin of the first Type-C port, and the fourth pin is connected to a second pin of the first Type-C port; and in a case that the second Type-C port and the first Type-C port are in a second plugging state, the third pin is connected to the second pin, and the fourth pin is connected to the first pin; where the first pin is configured to connect to a first microphone input module of the terminal, the second pin is configured to connect to a second microphone input module of the terminal, and the first microphone input module is different from the second microphone input module.

According to a third aspect, an embodiment of this disclosure further provides a terminal, including the audio circuit according to the first aspect.

According to a fourth aspect, an embodiment of this disclosure further provides an earpiece, including the audio circuit according to the second aspect.

According to a fifth aspect, an embodiment of this disclosure further provides an audio circuit control method, applied to the terminal according to the third aspect. The terminal is configured to perform audio transmission with the earpiece according to the fourth aspect, and the audio circuit control method includes:

monitoring a plugging status of a first Type-C port of the terminal and a second Type-C port of the earpiece in a case that the first Type-C port and the second Type-C port are connected by plugging; and in a case that the first Type-C port and the second Type-C port are detected to be in a first plugging state, controlling a second microphone input module to be off, so as to input an analog signal output by a microphone of the earpiece to a first microphone input module of the terminal; or in a case that the first Type-C port and the second Type-C port are detected to be in a second plugging state, controlling the first microphone input module to be off, so as to input the analog signal output by the microphone to the second microphone input module.

BRIEF DESCRIPTION OF THE DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings.

DESCRIPTION OF EMBODIMENTS

The following clearly describes the technical solutions in the embodiments of this disclosure with reference to the accompanying drawings in the embodiments of this disclosure. Apparently, the described embodiments are merely a part rather than all of the embodiments of this disclosure. All other embodiments that a person of ordinary skill in the art obtains based on the embodiments of this disclosure shall fall within the protection scope of this disclosure.

Figure 1:
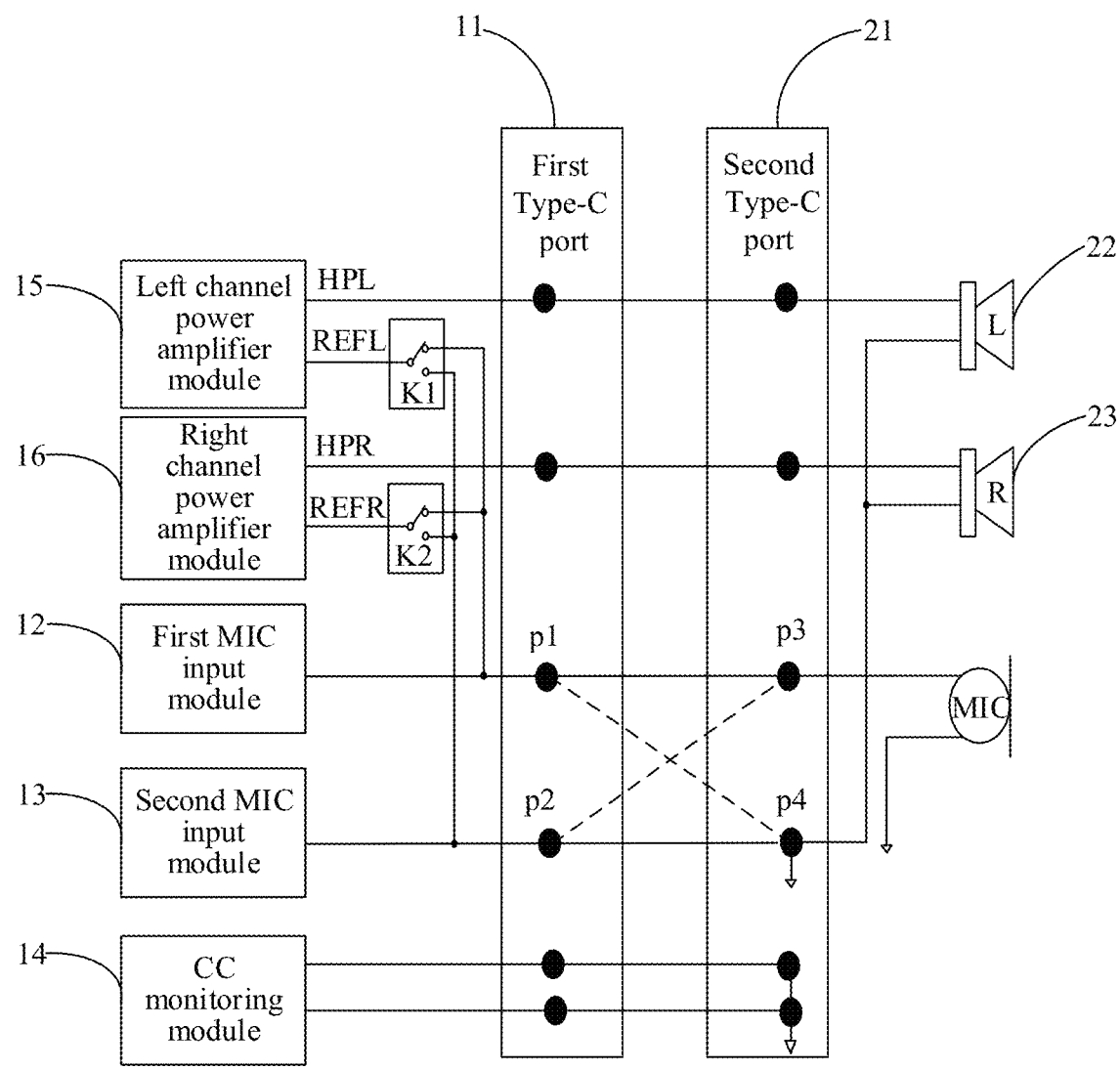
FIG. 1 is a first schematic diagram of a plugging structure of a first audio circuit and a second audio circuit according to an embodiment of this disclosure.

Referring to FIG. 1, FIG. 1 is a schematic diagram of a plugging structure of a first audio circuit and a second audio circuit according to an embodiment of this disclosure. The first audio circuit is applied to a terminal, and the terminal and an earpiece are able to be connected by plugging. As shown in FIG. 1, the first audio circuit includes a first Type-C port 11, a first microphone (MIC) input module 12, and a second microphone input module 13. The first Type-C port 11 includes a first pin p1 and a second pin p2. The first microphone input module 12 is connected to the first pin p1, the second microphone input module 13 is connected to the second pin p2, and the first microphone input module 12 is different from the second microphone input module 13.

In a case that the first Type-C port 11 and the second Type-C port 21 are in a first plugging state, the first pin p1 is connected to a third pin p3 of the second Type-C port 21, and the second pin p2 is connected to a fourth pin p4 of the second Type-C port 21 (the connection relationship is denoted by the solid lines in FIG. 1).

In a case that the first Type-C port 11 and the second Type-C port 12 are in a second plugging state, the second pin p2 is connected to the third pin p3, and the first pin p1 is connected to the fourth pin p4 (the connection relationship is denoted by the dashed lines in FIG. 1).

The third pin p3 is configured to connect to a first audio signal terminal of a microphone MIC; and the fourth pin p4 is configured to connect to a first ground terminal of the microphone and is grounded.

Herein, two microphone input modules are provided in the terminal. When the Type-C port of the terminal and the Type-C port of the earpiece are in the first plugging state or in the second plugging state, the microphone of the earpiece may be connected to different microphone input modules. In this way, the first audio circuit can receive, by using different microphone input modules in different plugging states, audio signals input by the microphone, with no need to add a switch, thereby reducing the possibility of recording distortion, and improving the recording quality.

It should be noted that, in this embodiment of this disclosure, for ease of description, the audio circuit in the terminal is described as the first audio circuit and the audio circuit applied to the earpiece is described as the second audio circuit; and when the earpiece and the terminal are connected by plugging, the first audio circuit is electrically connected to the second audio circuit for audio data transmission.

As shown in FIG. 1, the second audio circuit may include the second Type-C port 21 and the microphone MIC, and the second Type-C port 21 includes the third pin p3 and the fourth pin p4. The microphone MIC is provided with the first audio signal terminal and the first ground terminal. The first audio signal terminal is connected to the third pin p3, and the first ground terminal is connected to the fourth pin p4 and is grounded. In the case that the second Type-C port 21 and the first Type-C port 11 are in the first plugging state, the third pin p3 of the second audio circuit is connected to the first pin p1 of the first Type-C port 11, and the fourth pin p4 of the second audio circuit is connected to the second pin p2 of the first Type-C port 11. In the case that the second Type-C port 21 and the first Type-C port 11 are in the second plugging state, the third pin p3 of the second audio circuit is connected to the second pin p2, and the fourth pin p4 is connected to the first pin p1.

In addition, in the second audio circuit, the fourth pin p4 is connected to the first ground terminal of the microphone and is grounded. It can be understood that the fourth pin p4 and the first ground terminal are connected to a same ground terminal, for example, a ground terminal disposed on the second Type-C port 21 or a ground terminal outside the second Type-C port 21. Alternatively, the fourth pin p4 and the first ground terminal may be connected to different ground terminals, for example, the fourth pin p4 is connected to the ground terminal on the second Type-C port 21, and the first ground terminal is connected to the ground terminal outside the second Type-C port 21.

It should be noted that the first Type-C port 11 may be a Type-C socket, and the second Type-C port 21 may be a Type-C connector. To be specific, in the case that the first Type-C port 11 and the second Type-C port 21 are connected by plugging, the second Type-C port 21 plugs into the first Type-C port 11. In this way, in the first plugging state, the second Type-C port 21 plugs into the first Type-C port 11 in a proper direction; and in the second plugging state, the second Type-C port 21 plugs into the first Type-C port 11 in a reverse direction.

Alternatively, the first Type-C port 11 may be a Type-C connector, and the second Type-C port 21 may be a Type-C socket. To be specific, in the case that the first Type-C port 11 and the second Type-C port 21 are connected by plugging, the first Type-C port 11 plugs into the second Type-C port 21. In this way, in the first plugging state, the first Type-C port 21 plugs into the second Type-C port 11 in a proper direction; and in the second plugging state, the first Type-C port 21 plugs into the second Type-C port 11 in a reverse direction.

In addition, the first pin p1 and the second pin p2 may be an SBU1 pin and an SBU2 pin of the first Type-C port 11. The third pin p3 and the fourth pin p4 may be an SBU1 pin and an SBU2 pin of the second Type-C port 21, thereby retaining other multiplexing functions of the SBU1 and SBU2.

In a specific embodiment of this disclosure, the first audio circuit may further include other components, for example, the first audio circuit may further include a CC monitoring module 14 and a channel power amplifier module. The channel power amplifier module may include a left channel power amplifier module 15 and a right channel power amplifier module 16. The CC monitoring module 14 is configured to monitor a type of an external device that is connected to the first audio circuit by plugging. For example, the external device is a charging device, a data transmission device, an earpiece including a second audio circuit, or the like. The channel power amplifier module is configured to output a second audio signal to the second audio circuit 21 when the first audio circuit is connected to the second audio circuit, so that the second audio circuit outputs audio based on the second audio signal.

In a case that the first audio circuit 11 includes the left channel power amplifier module 15 and the right channel power amplifier module 16, the second audio circuit may further include a left earpiece body 22 and a right earpiece body 23. The left earpiece body 22 is configured to receive an audio signal output by the left channel, so as to output sound to the left ear, and the right earpiece body 23 is configured to receive an audio signal output by the right channel, so as to output sound to the right ear. Certainly, the earpiece body may alternatively be a monaural earpiece. To be specific, the second audio circuit includes only one earpiece body, and the first audio circuit includes only one channel power amplifier module connected to the monaural earpiece body. This is not limited herein.

In the case that the first audio circuit includes the left channel power amplifier module 15 and the right channel power amplifier module 16, each of the left channel power amplifier module 15 and the right channel power amplifier module 16 may be provided with a second audio signal terminal and a reference signal terminal. The second audio signal terminal is configured to output the second audio signal, and the reference signal terminal is configured to output a reference signal, so that the left channel power amplifier adjusts the second audio signal based on the reference signal to reduce noise for the second audio signal. In addition, each of the left earpiece body 22 and the right earpiece body 23 may be provided with a third audio signal terminal and a second ground terminal. When the first audio circuit is connected to the second audio circuit, the second audio signal terminal is connected to the third audio signal terminal, and the reference signal terminal is connected to the second ground terminal and is grounded.

More specifically, in the case that the first Type-C port 11 and the second Type-C port 21 are connected by plugging, a switch may be disposed at the second audio signal terminal and the reference signal terminal of the channel power amplifier module. With the switch, in the first plugging state and the second plugging state, the second audio signal terminal is connected to the third audio signal terminal, and the reference signal terminal is connected to the second ground terminal and is grounded.

For example, as shown in FIG. 1, in the first audio circuit, the left channel power amplifier module 15 is provided with an audio signal terminal HPL (which is the second audio signal terminal of the left channel power amplifier module 15) and a reference signal terminal REFL (which is the reference signal terminal of the left channel power amplifier module 15), and the REFL is connected to a first terminal of a switch K1. The right channel power amplifier module 16 is provided with an audio signal terminal HPR (which is the second audio signal terminal of the right channel power amplifier module 16) and a reference signal terminal REFR (which is the reference signal terminal of the right channel power amplifier module 16), and the REFR is connected to a first terminal of a switch K2. The HPL is connected to the audio signal terminal of the left earpiece body 22 (which is the third audio signal terminal of the left earpiece body 22) of the second audio circuit, and the HPR is connected to the audio signal terminal of the right earpiece body 23 (which is the third audio signal terminal of the right earpiece body 23) of the second audio circuit. The ground terminals of the left earpiece body 22 and the right earpiece body 23 are connected to the first ground terminal of the microphone. The first microphone input module 12 is separately connected to a second terminal of K1 and a second terminal of K2, and the second microphone input module 13 is separately connected to a third terminal of K1 and a third terminal of K2. In the case that the first Type-C port 11 and the second Type-C port 21 are in the first plugging state, the first terminal of K1 communicates with the third terminal of K1, and the first terminal of K2 communicates with the third terminal of K2. In the case that the first Type-C port 11 and the second Type-C port 21 are in the second plugging state, the first terminal of K1 communicates with the second terminal of K1, and the first terminal of K2 communicates with the second terminal of K2.

Optionally, the first Type-C port 11 further includes a fifth pin and a sixth pin, the audio circuit (which is the first audio circuit) further includes a channel power amplifier module, and the channel power amplifier module includes a second audio signal terminal and a reference signal terminal. The second audio signal terminal is connected to the fifth pin, and the reference signal terminal is connected to the sixth pin. In a case that the first Type-C port 11 and the second Type-C port 21 are connected by plugging, the fifth pin is connected to a seventh pin of the second Type-C port 21, and the sixth pin is connected to an eighth pin of the second Type-C port 21 and is grounded. The seventh pin is configured to connect to the third audio signal terminal of the earpiece, and the eighth pin is configured to connect to the second ground terminal of the earpiece.

Herein, no switch is required, to implement that in the first plugging state and the second plugging state, the second audio signal terminal can be connected to the third audio signal terminal, and the reference signal terminal is connected to the second ground terminal and is grounded, thereby reducing the possibility of audio distortion, and improving the quality of audio output by the second audio circuit.

Optionally, the channel power amplifier module includes at least one of the left channel power amplifier module 15 and the right channel power amplifier module 16. Therefore, disposition of the circuit structure of the first audio circuit is more flexible.

It should be noted that the earpiece may include the right earpiece body 23 in a case that the channel power amplifier module includes the right channel power amplifier module 16, and that the earpiece may include the left headphone body 22 in a case that the channel power amplifier module includes the left channel power amplifier module 15.

In addition, the reference signal terminal being connected to the second ground terminal and being grounded may be that, when the second Type-C port and the first Type-C port are connected by plugging, the eighth pin is connected to the sixth pin, the eighth pin is connected to the ground terminal of the second Type-C port, and the sixth pin is connected to the ground terminal of the first Type-C port. In this way, the reference signal terminal and the second ground terminal are both connected to a ground terminal nearby, thereby simplifying wiring of the first audio circuit and the second audio circuit. In addition, a ground wire on a PCB is generally wider, thereby reducing the crosstalk output from the left and right of the earpiece.

Figure 2:
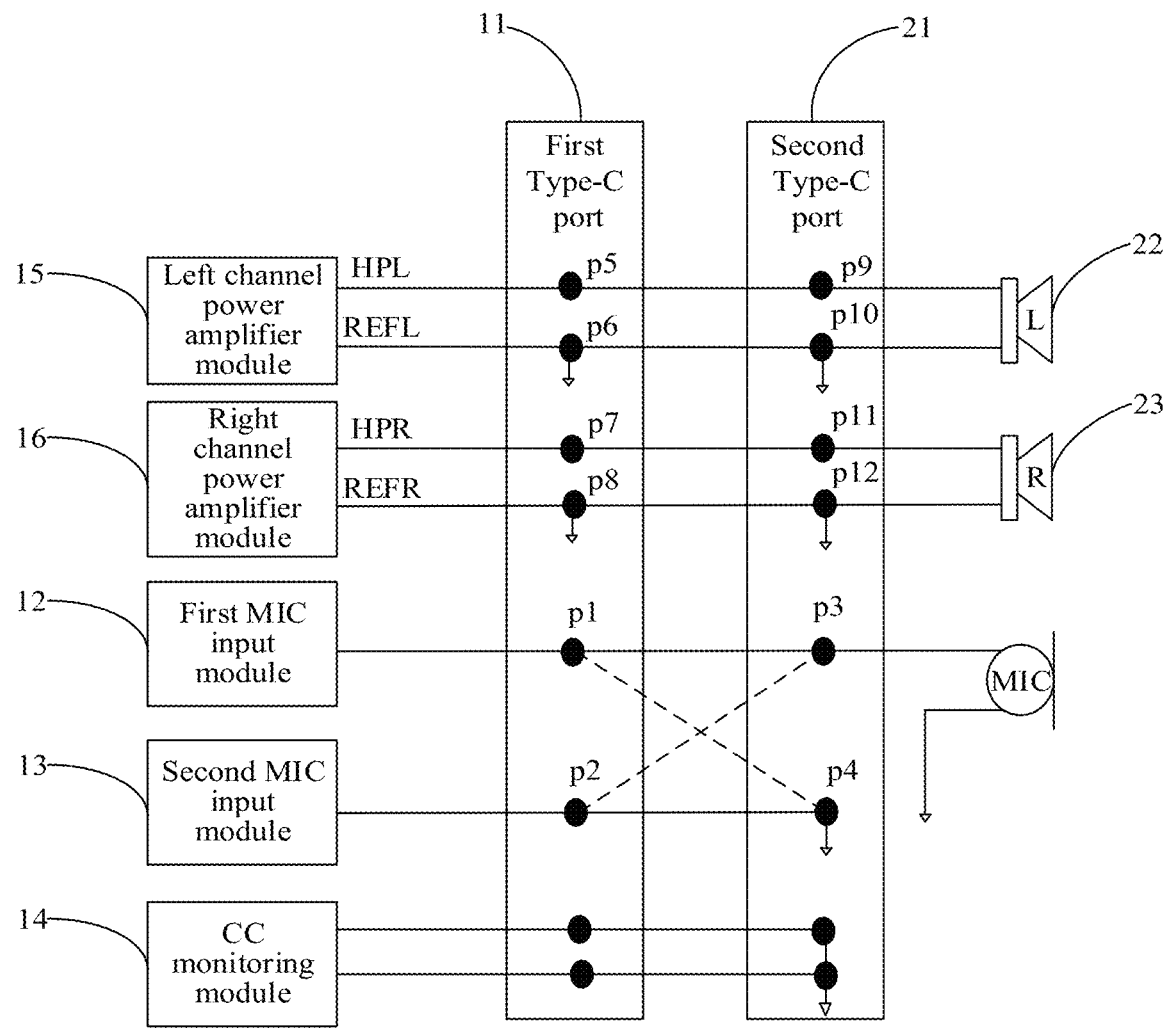
FIG. 2 is a second schematic diagram of a plugging structure of a first audio circuit and a second audio circuit according to an embodiment of this disclosure.

For example, as shown in FIG. 2, the channel power amplifier module includes a left channel power amplifier module 15 and a right channel power amplifier module 16. The first Type-C port 11 is provided with a pin p5, a pin p6, a pin p7, and a pin p8. An HPL of the left channel power amplifier module 15 is connected to the pin p5, and an REFL is connected to the pin p6; an HPR of the right channel power amplifier module 16 is connected to the pin p7, and an REFR is connected to the pin p8; and the pin p6 and the pin p8 are separately grounded. The earpiece includes a left earpiece body 22 and a right earpiece body 23, and the second Type-C port 21 is provided with a pin p9, a pin p10, a pin p11, and a pin p12. An audio signal terminal of the left earpiece body 22 is connected to the pin p9, and a ground terminal of the left earpiece body 22 is connected to the pin p10; an audio signal terminal of the right earpiece body 23 is connected to the pin p11, and a ground terminal of the right earpiece body 23 is connected to the pin p12; and the pin p10 and pin p12 are separately grounded.

The pin p5 and pin p7 may be connected to two sets of D+ and D− pins of the first Type-C port 11, so as not to affect the use of the DP function of the Type-C port. For example, the pin p5 is connected to two D+ pins of the first Type-C port 11, and the pin p7 is connected to two D− pins of the first Type-C port 11. The pins p6 and p8 are respectively connected to two sets of GND pins of the first Type-C port 11. For example, the pin p6 is connected to the GND pins of A1 and B1, and the pin p8 is connected to the GND pins of A12 and B12. In this way, regardless of whether the first Type-C port 11 and the second Type-C port 21 are in the first plugging state or the second plugging state, it is ensured that the right channel power amplifier module 16 outputs audio signals to the right earpiece body 23, and the left channel power amplifier module 15 outputs audio signals to the left earpiece body 22.

Figure 4:
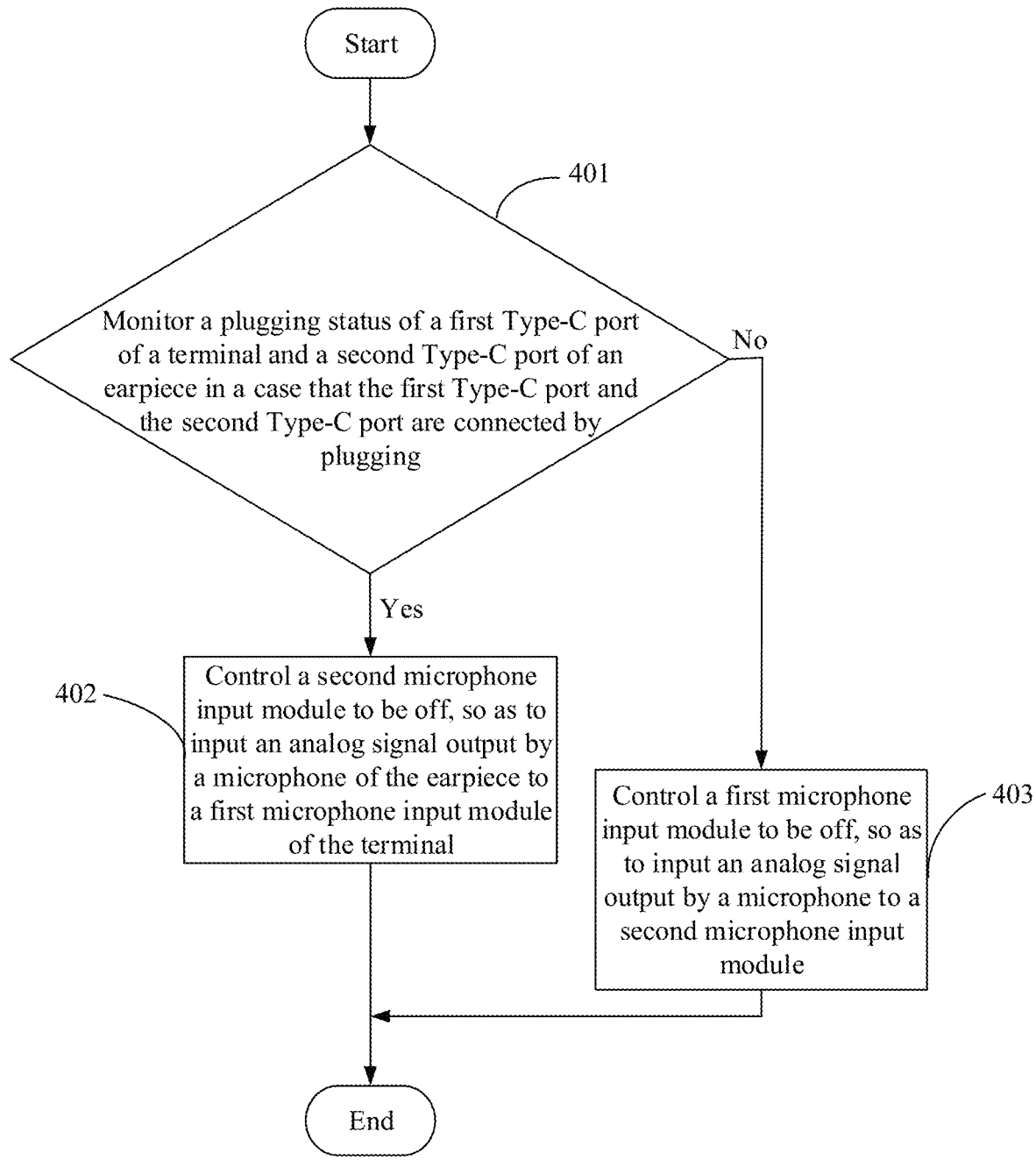
FIG. 4 is a flowchart of an audio circuit control method according to an embodiment of this disclosure.

It should be noted that the channel power amplifier module including a left channel power amplifier module and a right channel power amplifier module is used for description in the foregoing example. Certainly, the channel power amplifier module may alternatively include a left channel power amplifier module or a right channel power amplifier module. For example, in a case that the channel power amplifier module includes only the left channel power amplifier module, the REFL may be directly connected to the ground terminal of the first Type-C port 11 nearby, and the REFR may be connected to the first microphone input module 12 and the second microphone output module 13 by switching the switch K3, which is shown in FIG. 4.

Details are not described herein.

In this embodiment of this disclosure, the first audio circuit includes the first Type-C port 11, the first microphone input module 12, and the second microphone input module 13. The first Type-C port 11 includes the first pin p1 and the second pin p2, the first microphone input module 12 is connected to the first pin p1, and the second microphone input module 13 is connected to the second pin p2. The first microphone input module 12 is different from the second microphone input module 13. In the case that the first Type-C port 11 and the second Type-C port 21 are in the first plugging state, the first pin p1 is connected to the third pin p3 of the second Type-C port 21, and the second pin p2 is connected to the fourth pin p4 of the second Type-C port 21. In the case that the first Type-C port 11 and the second Type-C port 21 are in the second plugging state, the second pin p2 is connected to the third pin p3, and the first pin p1 is connected to the fourth pin p4. The third pin p3 is configured to connect to the first audio signal terminal of the microphone, and the fourth pin p4 is configured to connect to the first ground terminal of the microphone and is grounded. In this way, the first audio circuit can receive, by using different microphone input modules in different plugging states, audio signals input by the microphone, with no need to add a switch, thereby reducing the possibility of recording distortion, and improving the recording quality.

An embodiment of this disclosure further provides an audio circuit. The audio circuit is the second audio circuit in the foregoing embodiment. As shown in FIG. 1, the second audio circuit includes a second Type-C port 21 and a microphone. The second Type-C port 21 includes a third pin p3 and a fourth pin p4. The microphone is provided with a first audio signal terminal and a first ground terminal. The first audio signal terminal is connected to the third pin p3, and the first ground terminal is connected to the fourth pin p4.

In a case that the second Type-C port 21 and a first Type-C port 11 are in a first plugging state, the third pin p3 is connected to a first pin p1 of the first Type-C port 11, and the fourth pin p4 is connected to a second pin p2 of the first Type-C port 11.

In a case that the second Type-C port 21 and the first Type-C port 11 are in a second plugging state, the third pin p3 is connected to the second pin p2, and the fourth pin p4 is connected to the first pin p1.

The first pin p1 is configured to connect to the first microphone input module 12, the second pin p2 is configured to connect to the second microphone input module 13, and the first microphone input module 12 is different from the second microphone input module 13.

Optionally, the second Type-C port 21 further includes a seventh pin and an eighth pin, and the audio circuit further includes a third audio signal terminal and a second ground terminal. The seventh pin is connected to the third audio signal terminal, and the eighth pin is connected to the second ground terminal.

In a case that the second Type-C port 21 and the first Type-C port 11 are connected by plugging, the seventh pin is connected to a fifth pin of the first Type-C port 11, and the eighth pin is connected to a sixth pin of the first Type-C port 11 and is grounded.

The fifth pin is configured to connect to a second audio signal terminal of a channel power amplifier module, and the sixth pin is configured to connect to a reference signal terminal of the channel power amplifier module.

Optionally, the earpiece includes at least one of a right earpiece body and a left earpiece body.

Figure 3:
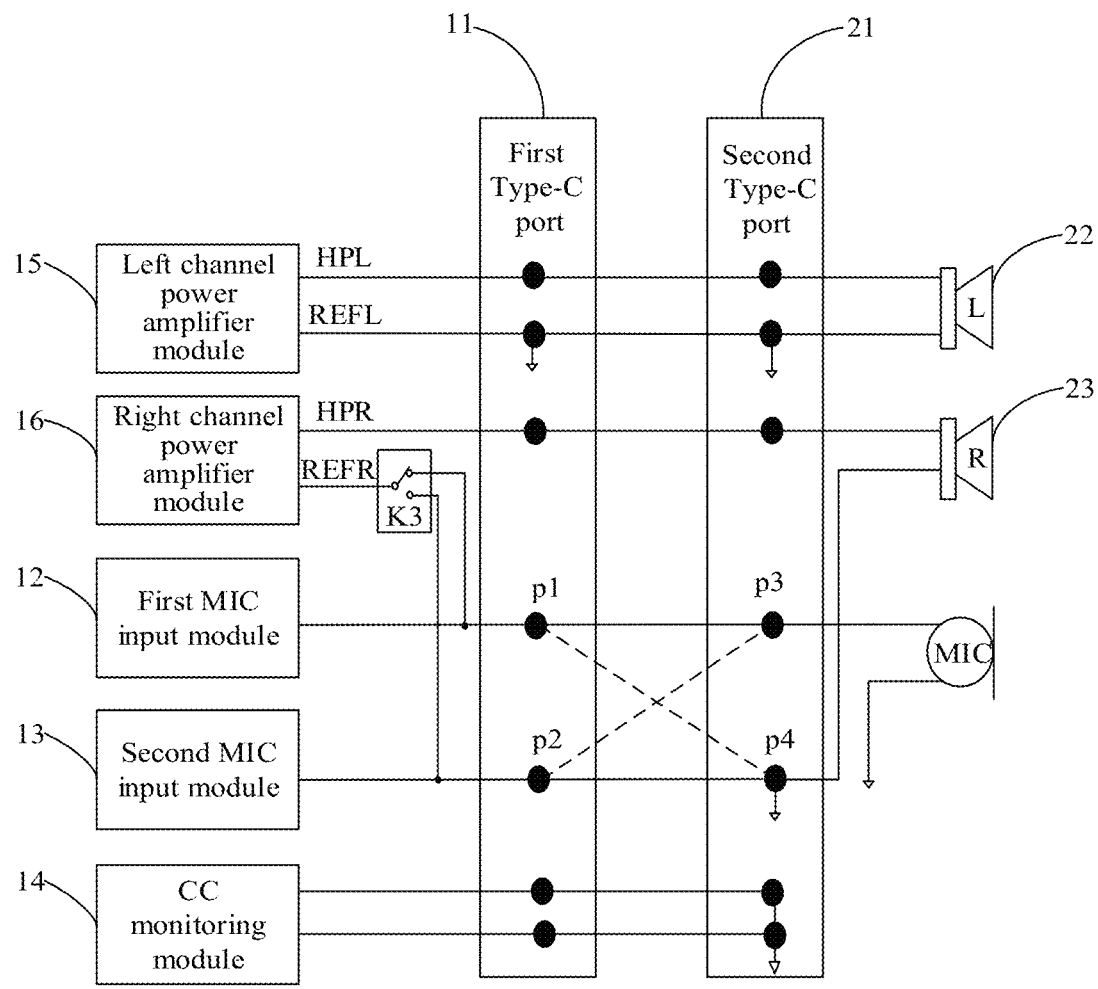
FIG. 3 is a third schematic diagram of a plugging structure of a first audio circuit and a second audio circuit according to an embodiment of this disclosure.

It should be noted that this embodiment serves as an implementation of the second audio circuit corresponding to the embodiments shown in FIG. 1 to FIG. 3; and for a specific implementation of this embodiment, reference may be made to related descriptions of the embodiments shown in FIG. 1 to FIG. 3. Details are not described in this embodiment to avoid repetition; and the same beneficial effects can be also achieved.

Based on the foregoing first audio circuit, an embodiment of this disclosure further provides a terminal, including the foregoing first audio circuit.

Because a body structure of the terminal is well known to those skilled in the art, and the first audio circuit has been described in the foregoing embodiments, the specific structure of the terminal is not described herein again.

In this embodiment of this disclosure, the terminal may be a mobile terminal, such as a mobile phone, a tablet computer (Tablet Personal Computer), a laptop computer, a personal digital assistant (PDA), a mobile Internet device (MID), or a wearable device; or may be other electronic devices, such as a digital camera, an e-book, or a navigator.

Based on the foregoing second audio circuit, an embodiment of this disclosure further provides an earpiece, including the foregoing second audio circuit.

Because a body structure of the earpiece is well known to those skilled in the art, and the second audio circuit has been described in the foregoing embodiments, the specific structure of the earpiece is not described herein.

Referring to FIG. 4, FIG. 4 is a flowchart of an audio circuit control method according to an embodiment of this disclosure. The method is applied to the foregoing terminal, and the terminal is configured to perform audio transmission with the foregoing earpiece. As shown in FIG. 4, the audio circuit control method includes the following steps.

Step 401: Monitor a plugging status of a first Type-C port of the terminal and a second Type-C port of the earpiece in a case that the first Type-C port and the second Type-C port are connected by plugging.

Step 402: In a case that the first Type-C port and the second Type-C port are detected to be in a first plugging state, control a second microphone input module to be off, so as to input an analog signal output by a microphone of the earpiece to a first microphone input module of the terminal.

Step 403: In a case that the first Type-C port and the second Type-C port are detected to be in a second plugging state, control the first microphone input module to be off, so as to input an analog signal output by the microphone to the second microphone input module.

In this embodiment of this disclosure, in the foregoing step 401, that the terminal monitors whether a plugging status of the first Type-C port and the second Type-C port is in the first plugging state may be implemented by monitoring properties such as voltage, current, or resistance of each pin of the first Type-C port.

Optionally, before the monitoring a plugging status of a first Type-C port of the terminal and a second Type-C port of the earpiece in a case that the first Type-C port and the second Type-C port are connected by plugging, the following step is further included:

monitoring a first resistance-to-ground value of the first microphone input module and a second resistance-to-ground value of the second microphone input module.

The monitoring a plugging status of a first Type-C port of the terminal and a second Type-C port of the earpiece in a case that the first Type-C port and the second Type-C port are connected by plugging includes:

in a case that the first resistance-to-ground value and the second resistance-to-ground value are greater than or equal to a first threshold and less than or equal to a second threshold, determining that the first Type-C port and the second Type-C port are connected by plugging, and comparing the first resistance-to-ground value and the second resistance-to-ground value; and in a case that the first resistance-to-ground value is greater than the second resistance-to-ground value, determining that the first Type-C port and the second Type-C port are in the first plugging state; or in a case that the first resistance-to-ground value is less than the second resistance-to-ground value, determining that the first Type-C port and the second Type-C port are in the second plugging state.

Herein, in the case that the first resistance-to-ground value and the second resistance-to-ground value are greater than or equal to the first threshold and less than or equal to the second threshold, the terminal may determine, based on the first resistance-to-ground value and the second resistance-to-ground value, whether the plugging status of the first Type-C port and the second Type-C port is in the first plugging state, thereby implementing more accurate detection.

The monitoring the first resistance-to-ground value of the first microphone input module and the second resistance-to-ground value of the second microphone input module may be that ADC modules built in the first microphone input module and the second microphone input module monitor voltages of the first pin and the second pin respectively, and obtain the first resistance-to-ground value and the second resistance-to-ground value through calculation based on the voltages of the first pin and the second pin respectively. The calculation method is well known in the art, and details are not described herein.

Optionally, after the monitoring the first resistance-to-ground value of the first microphone input module and the second resistance-to-ground value of the second microphone input module, the method further includes: in a case that the first resistance-to-ground value and the second resistance-to-ground value are less than the first threshold, determining that the first Type-C port and a Type-C port of a three-segment earpiece are connected by plugging; or in a case that the first resistance-to-ground value and the second resistance-to-ground value are greater than the second threshold, determining that the microphone of the earpiece connected to the first Type-C port by plugging is off. In this way, the terminal can determine, based on the first resistance-to-ground value and the second resistance-to-ground value, a working status of the microphone or a type of an earpiece that is connected by plugging.

In addition, before the foregoing step 401, the method may further include: identifying an external device that is connected to the first Type-C port of the terminal by plugging. For example, the terminal may monitor the external device by using CC pins of the first Type-C port. If the pins CC1 and CC2 are grounded (which is less than Ra, generally 1.2K), it is determined that the external device connected to the first Type-C port by plugging is an analog earpiece device; otherwise, the external device is other devices.

In this embodiment of this disclosure, when the first Type-C port of the terminal and the second Type-C port of the earpiece are connected by plugging, the plugging status of the first Type-C port and the second Type-C port is monitored. In the case that the first Type-C port and the second Type-C port are in the first plugging state, the second microphone input module is controlled to be off, so that the analog signal output by the microphone of the earpiece is input to the first microphone input module of the terminal; and in the case that the first Type-C port and the second Type-C port are in the second plugging state, the first microphone input module is controlled to be off, so that the analog signal output by the microphone is input to the second microphone input module. In this way, the audio circuit can receive, by using different microphone input modules in different plugging states, audio signals input by the microphone, with no need to add a switch, thereby reducing the possibility of recording distortion, and improving the recording quality.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An audio circuit, applied to a terminal, wherein the terminal and an earpiece are able to be connected by plugging, and the audio circuit comprises a first Type-C port, a first microphone input module, and a second microphone input module; the first Type-C port comprises a first pin and a second pin, the first microphone input module is connected to the first pin, and the second microphone input module is connected to the second pin; and the first microphone input module is different from the second microphone input module;

in a case that the first Type-C port and a second Type-C port of the earpiece are in a first plugging state, the first pin is connected to a third pin of the second Type-C port, and the second pin is connected to a fourth pin of the second Type-C port; and in a case that the first Type-C port and the second Type-C port are in a second plugging state, the second pin is connected to the third pin, and the first pin is connected to the fourth pin; wherein the third pin is configured to connect to a first audio signal terminal of a microphone of the earpiece, and the fourth pin is configured to connect to a first ground terminal of the microphone and is directly grounded;

wherein the first Type-C port further comprises a fifth pin and a sixth pin, the audio circuit further comprises a channel power amplifier module, the channel power amplifier module comprises a second audio signal terminal and a reference signal terminal, the second audio signal terminal is connected to the fifth pin, and the reference signal terminal is connected to the sixth pin; and in a case that the first Type-C port and the second Type-C port are connected by plugging, the fifth pin is connected to a seventh pin of the second Type-C port, and the six pin is connected to an eighth pin of the second Type-C port and is directly grounded; wherein the seventh pin is configured to connect to a third audio signal terminal of the earpiece, and the eighth pin is configured to connect to a second ground terminal of the earpiece;

wherein the first ground terminal and the second ground terminal are different terminals;

wherein the first Type-C port comprises a ninth pin and a tenth pin directly grounded, the ninth pin and the tenth pin are pins different from the first pin, the second pin, the fifth pin and the sixth pin in the first Type-C port, and the six pin is directly connected to the ninth pin and the tenth pin.

2. The audio circuit according to claim 1, wherein the channel power amplifier module comprises at least one of a right channel power amplifier module and a left channel power amplifier module.

3. An audio circuit, applied to an earpiece, wherein the earpiece and a terminal are able to be connected by plugging, the audio circuit comprises a second Type-C port and a microphone, the second Type-C port comprises a third pin and a fourth pin, the microphone is provided with a first audio signal terminal and a first ground terminal, the first audio signal terminal is connected to the third pin, and the first ground terminal is connected to the fourth pin and is directly grounded;

in a case that the second Type-C port and a first Type-C port of the terminal is in a first plugging state, the third pin is connected to a first pin of the first Type-C port, and the fourth pin is connected to a second pin of the first Type-C port; and in a case that the second Type-C port and the first Type-C port are in a second plugging state, the third pin is connected to the second pin, and the fourth pin is connected to the first pin; wherein the first pin is configured to connect to a first microphone input module of the terminal, the second pin is configured to connect to a second microphone input module of the terminal, and the first microphone input module is different from the second microphone input module;

wherein the second Type-C port further comprises a seventh pin and an eighth pin, the audio circuit further comprises a third audio signal terminal and a second ground terminal, the seventh pin is connected to the third audio signal terminal, and the eighth pin is connected to the second ground terminal; and in a case that the second Type-C port is connected to the first Type-C port by plugging, the seventh pin is connected to a fifth pin of the first Type-C port, and the eighth pin is connected to a sixth pin of the first Type-C port and is directly grounded; wherein the fifth pin is configured to connect to a second audio signal terminal of a channel power amplifier module of the terminal, and the sixth pin is configured to connect to a reference signal terminal of the channel power amplifier module;

wherein the first ground terminal and the second ground terminal are different terminals;

wherein the first Type-C port comprises a ninth pin and a tenth pin directly grounded, the ninth pin and the tenth pin are pins different from the first pin, the second pin, the fifth pin and the sixth pin in the first Type-C port, and the six pin is directly connected to the ninth pin and the tenth pin.

4. An earpiece, comprising the audio circuit according to claim 3.

5. A terminal, comprising an audio circuit, wherein the terminal and an earpiece are able to be connected by plugging, and the audio circuit comprises a first Type-C port, a first microphone input module, and a second microphone input module; the first Type-C port comprises a first pin and a second pin, the first microphone input module is connected to the first pin, and the second microphone input module is connected to the second pin; and the first microphone input module is different from the second microphone input module;

in a case that the first Type-C port and a second Type-C port of the earpiece are in a first plugging state, the first pin is connected to a third pin of the second Type-C port, and the second pin is connected to a fourth pin of the second Type-C port; and in a case that the first Type-C port and the second Type-C port are in a second plugging state, the second pin is connected to the third pin, and the first pin is connected to the fourth pin; wherein the third pin is configured to connect to a first audio signal terminal of a microphone of the earpiece, and the fourth pin is configured to connect to a first ground terminal of the microphone and is directly grounded;

wherein the first Type-C port further comprises a fifth pin and a sixth pin, the audio circuit further comprises a channel power amplifier module, the channel power amplifier module comprises a second audio signal terminal and a reference signal terminal, the second audio signal terminal is connected to the fifth pin, and the reference signal terminal is connected to the sixth pin; and in a case that the first Type-C port and the second Type-C port are connected by plugging, the fifth pin is connected to a seventh pin of the second Type-C port, and the six pin is connected to an eighth pin of the second Type-C port and is directly grounded; wherein the seventh pin is configured to connect to a third audio signal terminal of the earpiece, and the eighth pin is configured to connect to a second ground terminal of the earpiece;

wherein the first ground terminal and the second ground terminal are different terminals;

wherein the first Type-C port comprises a ninth pin and a tenth pin directly grounded, the ninth pin and the tenth pin are pins different from the first pin, the second pin, the fifth pin and the sixth pin in the first Type-C port, and the six pin is directly connected to the ninth pin and the tenth pin.

6. The terminal according to claim 5, wherein the channel power amplifier module comprises at least one of a right channel power amplifier module and a left channel power amplifier module.

7. An audio circuit control method, applied to the terminal according to claim 5, wherein the terminal is configured to perform audio transmission with an earpiece, and the audio circuit control method comprises:

monitoring a plugging status of a first Type-C port of the terminal and a second Type-C port of the earpiece in a case that the first Type-C port and the second Type-C port are connected by plugging; and in a case that the first Type-C port and the second Type-C port are detected to be in a first plugging state, controlling a second microphone input module to be off, so as to input an analog signal output by a microphone of the earpiece to a first microphone input module of the terminal; or in a case that the first Type-C port and the second Type-C port are detected to be in a second plugging state, controlling the first microphone input module to be off, so as to input the analog signal output by the microphone to the second microphone input module.

8. The method according to claim 7, wherein before the monitoring a plugging status of a first Type-C port of the terminal and a second Type-C port of the earpiece in a case that the first Type-C port and the second Type-C port are connected by plugging, the method further comprises:

monitoring a first resistance-to-ground value of the first microphone input module and a second resistance-to-ground value of the second microphone input module; and the monitoring a plugging status of a first Type-C port of the terminal and a second Type-C port of the earpiece in a case that the first Type-C port and the second Type-C port are connected by plugging comprises:

in a case that the first resistance-to-ground value and the second resistance-to-ground value are greater than or equal to a first threshold and less than or equal to a second threshold, determining that the first Type-C port and the second Type-C port are connected by plugging, and comparing the first resistance-to-ground value and the second resistance-to-ground value; and in a case that the first resistance-to-ground value is greater than the second resistance-to-ground value, determining that the first Type-C port and the second Type-C port are in the first plugging state; or in a case that the first resistance-to-ground value is less than the second resistance-to-ground value, determining that the first Type-C port and the second Type-C port are in the second plugging state.

9. The method according to claim 8, wherein after the monitoring a first resistance-to-ground value of the first microphone input module and a second resistance-to-ground value of the second microphone input module, the method further comprises:

in a case that the first resistance-to-ground value and the second resistance-to-ground value are less than the first threshold, determining that the first Type-C port and a Type-C port of a three-segment earpiece are connected by plugging; or in a case that the first resistance-to-ground value and the second resistance-to-ground value are greater than the second threshold, determining that the microphone of the earpiece that is connected to the first Type-C port by plugging is off.

10. The method according to claim 7, wherein an audio circuit of the earpiece comprises a second Type-C port and a microphone, the second Type-C port comprises a third pin and a fourth pin, the microphone is provided with a first audio signal terminal and a first ground terminal, the first audio signal terminal is connected to the third pin, and the first ground terminal is connected to the fourth pin and is directly grounded;

in a case that the second Type-C port and a first Type-C port of the terminal is in a first plugging state, the third pin is connected to a first pin of the first Type-C port, and the fourth pin is connected to a second pin of the first Type-C port; and in a case that the second Type-C port and the first Type-C port are in a second plugging state, the third pin is connected to the second pin, and the fourth pin is connected to the first pin; wherein the first pin is configured to connect to a first microphone input module of the terminal, the second pin is configured to connect to a second microphone input module of the terminal, and the first microphone input module is different from the second microphone input module.

11. The method according to claim 10, wherein the second Type-C port further comprises a seventh pin and an eighth pin, the audio circuit further comprises a third audio signal terminal and a second ground terminal, the seventh pin is connected to the third audio signal terminal, and the eighth pin is connected to the second ground terminal; and in a case that the second Type-C port is connected to the first Type-C port by plugging, the seventh pin is connected to a fifth pin of the first Type-C port, and the eighth pin is connected to a sixth pin of the first Type-C port and is directly grounded; wherein the fifth pin is configured to connect to a second audio signal terminal of a channel power amplifier module of the terminal, and the sixth pin is configured to connect to a reference signal terminal of the channel power amplifier module.

* * * * *